Feb. 27, 1934.  J. BIJUR  1,948,503
FLOW CONTROL FITTING
Filed Feb. 21, 1930
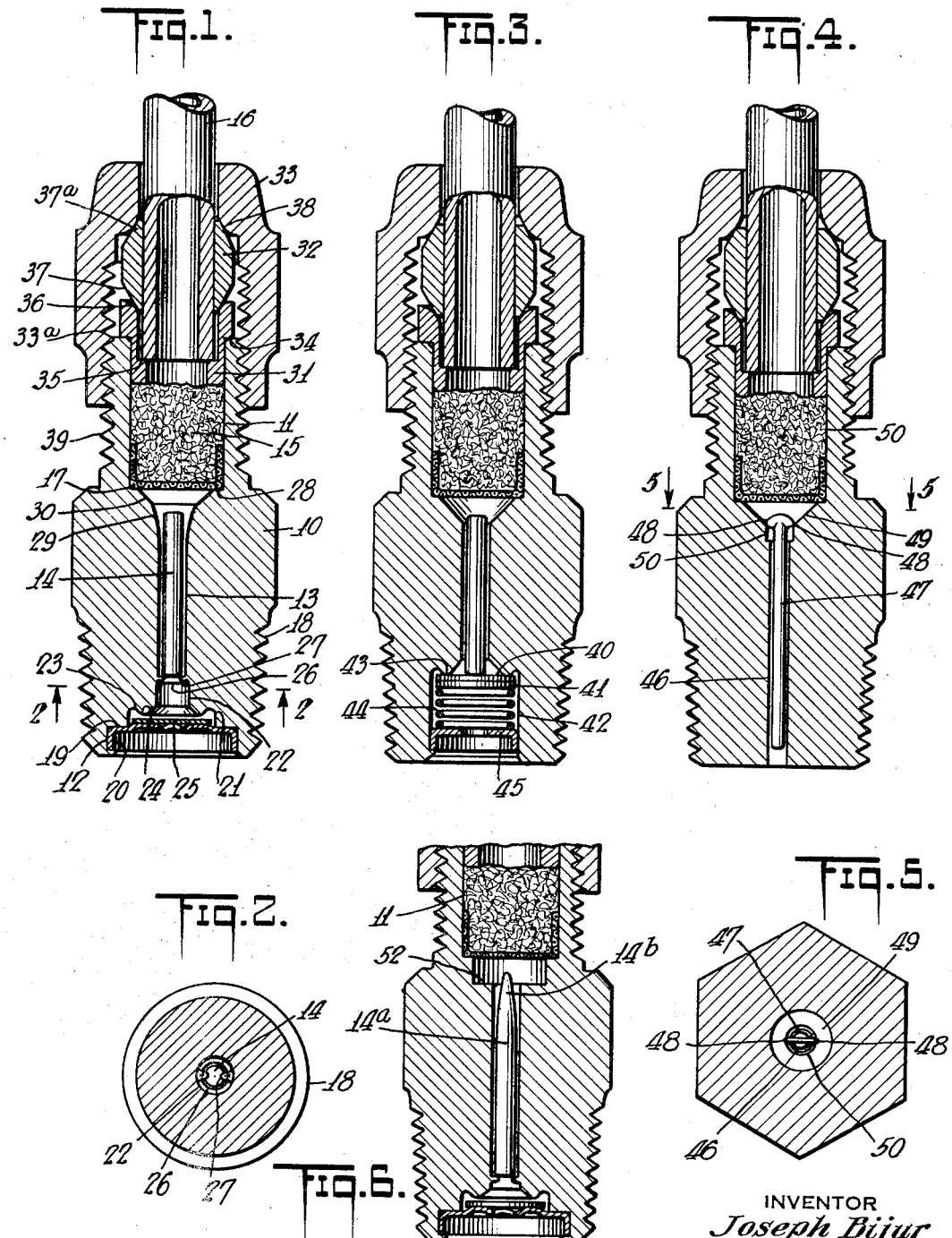
INVENTOR
*Joseph Bijur*
BY
ATTORNEYS Patented Feb. 27, 1934

1,948,503

UNITED STATES PATENT OFFICE 1,948,503

FLOW CONTROL FITTING

Joseph Bijur, New York, N. Y., assignor to Auto Research Corporation, a corporation of Delaware Application February 21, 1930. Serial No. 430,334

25 Claims. (Cl. 184—7)

My present invention relates primarily to lubrication and is more especially concerned with the control devices which determine the flow through any or all of the outlet branches of a pressure operated central lubricating installation, although the invention in its broader aspects is applicable to the flow control of other fluids.

More specifically the invention relates to the general class of flow control fitting known as a drip plug and exemplified, for instance, in Patent #1,632,772 granted to me June 14, 1927.

The drip plug of the present invention retains substantially all of the advantageous features of the patented drip plug, such for instance as rugged construction, absence of moving parts, convenience of assembly and handling, dust proof construction, economy of manufacturing cost and reliability of operation and preferably embodies the same type of flow restricting means, namely a bore substantially filled by a restriction pin to afford a minute flow crevice.

An object of the present invention is to provide means for conveniently so coupling the control fitting to the outlet end of a supply conduit, that said elements are firmly secured against casual disengagement and in oil-tight relation without the need for flaring or flanging the end of the pipe, yet readily disconnectable for purposes of replacement and repair.

Another object is to provide a compact drip plug of the above type in which the wrench-receiving element of the coupling may be formed from the same gauge of bar stock as the drip plug itself.

Another object is to minimize the danger of clogging the flow determining restriction crevice with colloidal particles that may pass with the oil by or through the filters.

Another object is to provide a drip plug devoid of a spring seated valve and in which a loose restriction pin is yet effectively maintained against loss or displacement, without thereby altering the flow resistance of the drip plug.

A flow control fitting constructed in accordance with the present invention preferably includes a body portion having an end to be fixed in a bearing hole and an end to be coupled to a supply pipe. A central longitudinal accurately machined bore in the body is substantially filled by a restriction pin. A filter wad in advance of the pin guards against the passage of scale or chips and assures the delivery of clean oil at the crevice between pin and bore.

In accordance with one embodiment of the invention, the space between the filter wad and the restriction pin is of progressively decreasing diameter toward the restriction pin, to the end that the increase of velocity of oil flow due to decrease of cross section may be gradual rather than sudden in order to avoid precipitation of viscous colloidal material at the flow restriction.

Where the spring type of valve is eliminated, a suction flap valve may be employed at the outlet end of the plug beyond the pin to prevent interpipe siphoning. This valve might not function if the weight of the restriction pin rested upon it and, therefore, where the flap valve is used, means other than the valve is preferably provided to retain the pin against outward movement.

The present invention is a continuation in part of my copending application, Serial No. 262,123, for Automatic lubricator, filed March 16th, 1928.

The invention may be more fully understood from the following description in connection with the accompanying drawing wherein:

Fig. 1 is an enlarged longitudinal sectional view through a drip plug embodying the invention, Fig. 2 is a transverse sectional view therethrough, taken approximately on the line 2—2 of Fig. 1, Figs. 3 and 4 are views similar to Fig. 1 but showing modifications, Fig. 5 is a transverse sectional view taken on the line 5—5 of Fig. 4, and Fig. 6 is a fragmentary sectional detail of a further modification.

The drip plug of Figs. 1 and 2 includes a metal body 10 having axially aligned sockets 11 and 12 at its inlet and outlet ends respectively and formed with a reduced, accurately machined, central bore 13 connecting the sockets, this bore being substantially filled by a flow restriction element such as the restriction pin 14. Usually the bores 13 of all drip plugs, are of uniform size and the flow resistance is determined by the diameter of the restriction pin which is used. Pin and bore define a minute annular crevice substantially as in my prior patent which the oil must traverse. The crevice between the pin and bore is shown exaggerated in the drawing.

Mounted within the socket is a wad of strainer material 15 adapted to trap minute particles of scale or other foreign matter which may be carried from the feed pipe 16 by the oil stream. In order to prevent the individual fibres of the strainer wad from working loose and finding their way into the crevice between the pin 14 and bore 13 the wad is preferably backed by a wire mesh cup 17.

Polygonal bar stock may be used to form the plug body, the cross sectional shape of such stock determining the shape of the wrench-receiving intermediate section of the body which is externally tapered and threaded at its outlet end 18 for convenient application to a threaded hole in a stationary bearing member.

The outlet socket 12 is provided with an outwardly facing shoulder 19 to limit the inward movement of a force fitted retainer cup or disc 20. Inwardly beyond this disc the socket 12 is reduced in diameter at 21 and communicates at its center with a further reduced innermost socket portion 22, which in turn communicates with the further reduced central bore 13. The shoulder 23 which is defined by the reduced socket portion 22 is preferably formed with an outward facing annular valve seat 24 with which a suction flap valve 25 is adapted to coact, this valve being retained against outward displacement by the cup 20.

The primary purpose of the valve 25 is to prevent inter-pipe siphoning between drip plug outlet fittings located at different levels on the machine to be lubricated, such for instance as the chassis of an automobile, and the manner in which it fulfills this function will be apparent. Whenever the longer leg of two freely communicating feed pipes tends to siphon oil from the shorter leg, the flap valve 25 of the shorter leg will immediately be drawn against its seat to cut off air from the shorter pipe and thereby prevent siphoning.

This type of valving is particularly suitable for centralized pressure lubricating systems of the continuous feed type such for instance as the systems claimed in my prior Patent No. 1,732,212, granted October 15, 1929.

In order for the suction flap valves to function properly it is desirable to keep the weight of the restriction pin 14 off of the valve and to utilize some means other than the valve itself for preventing endwise displacement of the pin.

In Fig. 1 one convenient means of retaining the pin against outward displacement is shown. It is accomplished by staking at the narrow outwardly facing shoulder 26 between the bore 13 and the socket section 22. Staking is done by simply applying a pointed tool at the shoulder and striking the tool to cause burrs or stakes 27 to be struck inwardly into the path of the outward movement of the pin. They effectively sustain the weight of the pin and are of such small size and so few in number, that they do not materially decrease the effective cross sectional area of the annular flow crevice about the pin.

The socket 11 which accommodates the strainer means is of cylindrical form throughout the major portion of its length and may be provided with a narrow shoulder 28 on which the cup 17 bottoms. Beyond the cup the socket is of gradually and progressively reduced diameter as indicated at 29, and merges gradually into the bore 13. Instead of carrying the conventional drill tip angle 30 directly into the bore 13, this angle is gradually tapered off until it merges in the bore.

By this arrangement a gradual decrease of cross-section of the flow stream is attained, and a corresponding gradual increase of linear flow rate. This is desirable in certain cases where the oil has minute pigment like colloidal particles, of character such as to traverse even a fine filter. Much of such ingredient might settle out by inertia at the inlet to the restriction passage, were the increase in speed of oil flow at such inlet quite rapid, and clogging might then occur. By the simple expedient of tapering the flow passage as shown the danger of such clogging is obviated.

The coupling embodies an adapter sleeve 31 of hardened steel the reduced end of which fits into the socket 11 and retains the filter wad 15 against displacement, insertion of the adapter into the socket being limited by an external shoulder 34 which abuts the end of the plug 10. The adapter, internally of the socket 11, is also formed with an internal shoulder 35 against which the end of the pipe 16 abuts. The mouth of the adapter 31 is flared at 36 for coaction with the externally bevelled or tapered end 37 of the coupling sleeve 32, said sleeve having a similar opposite end 37ᵃ for engagement with a tapered internal shoulder 38 of the nut 33. The sleeve 32 is thus of cylindrical internal shape and is externally substantially barrel-shaped, presenting end portions which are readily circumferentially contractible under the influence of complementary bevelled clamping elements exerting a combined endwise and radial pressure on the ends of the sleeve.

The nut 33 is internally threaded at 33ᵃ for coaction with the reduced external threaded portion 39 of the plug body 10. The intermediate portion of the nut 33 is preferably of external polygonal shape, and the nut may be machined from bar stock of the same cross sectional shape as the body of the drip plug.

To effect coupling, the adapter 31 is first frictionally fitted into the mouth of the socket 11. The nut is slipped over the pipe end 16 and the sleeve 32 is slipped over after it. The pipe end is then inserted into the adapter until it abuts the shoulder 35. The nut 33 is then tightened, that is to say, screwed over the threaded end of the plug body until the tapered ends of the sleeves are engaged by the tapered sections 38, 36 of the nut and the adapter respectively. Upon further tightening of the nut distortion of the sleeve 32 occurs along the line of least resistance. The two tapered ends thereof are circumferentially contracted and caused to bite into or become crimped into the pipe 16.

The nut and body are preferably of brass and the adapter may be of steel thereby not only thickening, but strengthening the sleeve deforming wall. Furthermore the adapter serves to retain the filter wad in place and provides an abutment for the pipe end, all without the need for special machining operations on the body of the drip plug.

In Fig. 3, I have shown the type of coupling just described as applied to a drip plug of the spring valve type. Here the restriction pin rests directly upon the oiled silk facing 40 of a valve 41 arranged in a socket 42 at the outlet end of the plug and urged against its seat 43 by a coiled expansion spring 44 backed against a reaction disc 45 force fitted into the socket. Where a valve of this character is used, the pressure of the spring itself is adequate to support the weight of the pin.

In Fig. 4, I have shown another type of drip plug embodying the same coupling means as in Fig. 1, but being totally devoid of valve mechanism. Bore 46 for the restriction pin 47 in this case extends through to the outlet and the inner end of the restriction pin 47 is flattened to provide a pair of diametrically opposed projections 48 resting upon the tapered bottom 49 of the inlet socket 50. It is desirable that the projections 48 shall not reduce the effective cross-sectional area of the flow crevice between the pin 47 and bore 46 and I therefore provide at the bottom of the socket 49 a reduced cylindrical pocket member 50 of greater cross-sectional area than the bore 46 but of a diameter which is less than the width of the flattened end 48 of the restriction pin. Consequently the oil flows freely into the pocket 50 about the flattened end of the restriction pin which in no way impedes free flow of oil to the restriction crevice.

The drip plug of Fig. 6 functions in a similar manner to that of Fig. 1 except for the fact that in this instance, the desired gradual decrease in cross-sectional area of the flow passage as the restriction crevice is reached is accomplished by tapering the end of the restriction pin 14a as indicated at 14b. The restriction pin bore in this instance, may be straight and the socket 11 may be flat bottomed as indicated at 52.

I claim:

1. A flow control element of the class described including a fitting adapted to be applied at a bearing and to be coupled in liquid tight relationship to a feed pipe supplying oil to the bearing, a resistance element defining a restricted flow crevice of invariant flow resistance, the fitting providing a flow passage of gradually decreasing cross-sectional area adjacent the inlet of the crevice.

2. A flow control element of the class described including a fitting adapted to be applied at a bearing and to be coupled in liquid tight relationship to a feed pipe supplying oil to the bearing, said fitting including a strainer means at its inlet end and a resistance element beyond the strainer defining a restricted flow crevice of invariant flow resistance, and a springless suction flap valve beyond the outlet end of the crevice.

3. A flow control element of the class described including a fitting adapted to be applied at a bearing and to be coupled in liquid tight relationship to a feed pipe supplying oil to the bearing, said fitting including a strainer means at its inlet end and a resistance element beyond the strainer defining a restricted flow crevice of invariant flow resistance, a springless flap valve means beyond the outlet end of the crevice, and means to support the flow resistance element out of contact with said valve.

4. A flow control fitting of the class described having a longitudinal bore therein, a rigid pin loosely filling said bore with a minute clearance offering a high resistance to flow, said pin including integral means engageable with the fitting and retaining the pin against movement in one direction and said bore being of increased diameter adjacent said means.

5. A flow control fitting of the class described having a lingitudinal bore therein, a rigid pin loosely filling said bore with a minute clearance offering a high resistance to flow, said pin including integral means engaging the fitting and retaining the pin against movement in one direction, without reducing the effective cross-sectional area of the clearance and said bore being of increased diameter adjacent said means.

6. A drip plug having a longitudinal bore therein, a rigid pin loosely filling said bore with a minute clearance offering a high resistance to flow, a strainer plug in a corresponding socket at the inlet end of said fitting serving as a stop to limit movement of the pin in one direction and means carried by the pin to limit its movement in the other direction and said bore being of increased diameter adjacent said means.

7. A drip plug having a longitudinal bore therein, a rigid pin loosely filling said bore with a minute clearance offering a high resistance to flow, a strainer plug in a corresponding socket at the inlet end of said fitting serving as a stop to limit movement of the pin in one direction, the fitting being staked beyond the pin to limit movement of the pin in the other direction.

8. A drip plug having a longitudinal bore therein, a rigid pin loosely filling said bore with a minute clearance offering a high resistance to flow, a strainer plug in a corresponding socket at the inlet end of said fitting serving as a stop to limit movement of the pin in one direction, and means integral with the fitting to limit movement of the pin in the opposite direction.

9. A drip plug having a longitudinal bore therein, a rigid pin loosely filling said bore with a minute clearance offering a high resistance to flow, a strainer plug in a corresponding socket at the inlet end of said fitting serving as a stop to prevent the restriction pin from dropping out of the fitting through the inlet end, a valve at the outlet end of the fitting and means independent of the valve for limiting movement of the pin in the other direction.

10. A drip plug having a longitudinal bore therein, a rigid pin loosely filling said bore with a minute clearance offering a high resistance to flow, a strainer plug in a corresponding socket at the inlet end of said fitting serving as a stop to limit movement of the pin in one direction and means carried by the pin to limit its movement in the other direction, comprising a head on the pin engaged with a corresponding shoulder in the fitting and said bore being of increased diameter adjacent said means.

11. A drip plug having a longitudinal bore therein, a rigid pin loosely filling said bore with a minute clearance offering a high resistance to flow, a strainer plug in a corresponding socket at the inlet end of said fitting serving as a stop to prevent the restriction pin from dropping out of the fitting through the inlet end, said pin having a head, the bottom of the strainer plug socket being tapered and affording a stop for said head to prevent movement of the pin in the other direction.

12. A drip plug having a longitudinal bore therein, a rigid pin loosely filling said bore with a minute clearance offering a high resistance to flow, a strainer plug in a corresponding socket at the inlet end of said fitting serving as a stop to prevent the restriction pin from dropping out of the fitting through the inlet end, said pin having a head, the bottom of the strainer plug socket being tapered and affording a stop for said head to prevent movement of the pin in the other direction, said socket beyond the head having a reduced pocket therein of greater cross-sectional area than the bore and of less diameter than the width of the head.

13. A flow control fitting of the class described having a longitudinal bore therein, a rigid pin loosely filling said bore with a minute clearance offering a high resistance to flow, the inner end of said pin being deformed to define projecting portions and means cooperating with said portions to limit movement of the pin in an outward direction without reducing the effective cross-sectional area of the flow crevice and said bore being of increased diameter adjacent said means.

14. A drip plug fitting including a body portion having an end to be applied at a bearing and an end to be coupled to a feed pipe and having sockets in the respective ends connected by a reduced bore, a filter wad in the inlet socket, a flow restricting element in the bore and a springless suction flap valve in the outlet socket.

15. A drip plug fitting including a body portion having an end to be applied at a bearing and an end to be coupled to a feed pipe and having sockets in the respective ends connected by a reduced bore, a filter wad in the inlet socket, a flow restricting element in the bore, a springless suction flap valve in the outlet socket, said outlet socket defining an outwardly facing seat with which said flap valve is adapted to coact and a retainer limiting the movement of said valve away from its seat.

16. A drip plug fitting including a body portion having an end to be applied at a bearing and an end to be coupled to a feed pipe and having sockets in the respective ends connected by a reduced bore, a filter wad in the inlet socket, a flow restricting element in the bore, a springless suction flap valve in the outlet socket, said outlet socket defining an outwardly facing seat with which said flap valve is adapted to coact, a retainer limiting the movement of said valve away from its seat and means to maintain the weight of the flow restricting element off of the flap valve.

17. A drip plug fitting including a body portion having an end to be applied at a bearing and an end to be coupled to a feed pipe and having sockets in the respective ends connected by a reduced bore, a filter wad in the inlet socket, a flow restricting element in the bore, a suction flap valve in the outlet socket, said outlet socket defining an outwardly facing seat with which said flap valve is adapted to coact, a retainer limiting the movement of said valve away from its seat and means to maintain the weight of the flow restricting element off of the flap valve comprising stakes struck from the inner end of the outlet socket and supporting said element.

18. A drip plug including a fitting having a socket in its inlet end, a filter wad in the socket, means beyond the filter to afford a flow resistance and an adapter member in the outer end of the socket retaining the filter in place and adapted to serve as an abutment for the end of a pipe to be coupled to the fitting.

19. A flow control fitting of the class described, having a longitudinal bore therein, a restriction member filling said bore with a gradated minute clearance, offering an increasingly high resistance in the direction of flow, means imposing resistance to movement of the pin in the direction of flow, a strainer plug in the fitting, said strainer plug cooperating with the fitting to provide an oil chamber between the plug and the pin.

20. A flow control fitting of the class described having a longitudinal bore therein, a rigid pin loosely filling said bore with a minute clearance offering a high resistance to flow, said pin being of substantially uniform cross sectional shape throughout its length and said bore flaring at the inlet end of the pin.

21. A flow control fitting of the class described having a longitudinal bore therein, a rigid pin loosely filling said bore with a minute clearance offering a high resistance to flow, said bore being of substantially uniform cross sectional shape throughout its length and said pin tapering at the region of the inlet end of the bore whereby to provide a progressively constricted annular flow passage adjacent the inlet end of the bore.

22. A drip plug having a longitudinal bore therein, a rigid pin loosely filling said bore with a minute clearance offering a high resistance to flow, means in a corresponding socket at the inlet end of said fitting serving as a stop to prevent the restriction pin from dropping out of the fitting through the inlet end, said pin having a head, the bottom of the socket being tapered and affording a stop for said head to prevent movement of the pin in the other direction, said socket beyond the head having a reduced pocket therein of greater cross-sectional area than the bore and of less diameter than the width of the head.

23. A flow controlling unit comprising an elongated body with externally threaded nipple end portions and with a central axial passageway therethrough the ends of which are enlarged, bearing connecting elements and conduit connecting elements respectively threaded upon the outlet and inlet nipple ends of said body and inserts press-fitted in the outer ends of said enlarged ends, a strainer being held in position by an insert in the inlet enlargement and a valve being held in position by the insert in the outlet enlargement, the enlargement at the end of said central axial passageway adjacent said strainer taking the form of a conical depression whereby a gradual decrease of cross section of the flow stream will be attained with a corresponding gradual increase of the linear rate.

24. In a flow controlling unit, an elongated body having threaded end portions and having a central passageway therethrough of diverse diameters, said passageway decreasing in diameter toward the middle portion of the body and being successively provided with a plurality of shoulders from its inlet to its outlet end and a plurality of instrumentalities retained in position by said shoulders, said instrumentalities being successively from said inlet to said outlet end, a strainer retainer, a strainer, a restriction, a valve and a valve retainer.

25. A flow controlling drip plug including a liquid-passing fitting body with an inlet end and an outlet end, a strainer therein, a liquid feed pipe, means for coupling together said fitting and said pipe, said fitting having a socket in its inlet end receiving said strainer, an adapter sleeve in the socket and securing said strainer in said socket against outward displacement, said adapter sleeve having an abutment for the end of the feed pipe and having an inclined mouth, an elongated nut internally threaded for engagement with the exterior of the inlet end of the fitting and having an internally inclined portion, a compression coupling sleeve encircling the pipe and having tapered end portions adapted to be circumferentially contracted into the pipe gripping position by engagement with the inclined surfaces of the adapter sleeve and the nut as the latter is screwed home.

JOSEPH BIJUR.